April 22, 1969  J. C. WORST  3,439,896

PILOT TYPE VALVE

Filed April 3, 1967

INVENTOR.
JOSEPH C. WORST
BY
HIS ATTORNEY

United States Patent Office 3,439,896
Patented Apr. 22, 1969

3,439,896
PILOT TYPE VALVE
Joseph C. Worst, Louisville, Ky., assignor to General Electric Company, a corporation of New York
Filed Apr. 3, 1967, Ser. No. 627,888
Int. Cl. F16k 31/165
U.S. Cl. 251—38    4 Claims

ABSTRACT OF THE DISCLOSURE

A pilot valve of the type in which the pilot flow is through the valve diaphragm. A flexible, permeable member is mounted for movement with the diaphragm and is located between the valve inlet and the pilot flow opening in the diaphragm to filter the pilot flow.

BACKGROUND OF THE INVENTION

Pilot type liquid flow control valves are well known in the art. With such valves a portion of the main liquid stream is bled off and used as a pilot flow for the valve. Then, by controlling the small pilot stream, the valve may be caused to control the larger main stream.

These valves generally are of one or two kinds. In the first which may be called the remote type, the pilot stream is bled off at a point remote from the main stream control diaphragm. In the second, or direct, type the pilot stream flows through one or more small pilot openings in the main stream diaphragm.

From the standpoint of simplicity of construction and ease of operation the direct type is preferable. However, for many installations, where there may be solid contaminants in the liquid, it has been necessary to use the more complicated and costly remote type. With either type, the pilot stream flows through rather small openings and, if they become clogged by some contaminant, the valve will malfunction. The remote type often has been used in the past since its pilot flow could be filtered even though the direct type otherwise would be preferable. This was because prior art pilot valves of the direct type had no satisfactory arrangement for filtering the pilot stream.

An object of this invention is to provide an improved pilot valve of the type in which the pilot stream flows through an appropriate opening in the main valve diaphragm.

Another object of this invention is to provide such a valve in which the pilot stream is filtered prior to reaching the pilot opening in the diaphragm.

Yet another object of this invention is to provide such a valve in which the flow of the pilot stream is not interrupted even if the filter traps some contaminant.

A further object of this invention is to provide such a valve in which the filter for the pilot flow is positioned so that the main stream has a cleansing effect on it.

SUMMARY OF THE INVENTION

In accordance with one embodiment of this invention there is provided a valve including a housing having an inlet and an outlet. A flexible diaphragm is mounted in the housing and is movable between a valve closed and a valve open position. A bleed opening is formed in the diaphragm to allow pilot flow through the diaphragm and a flexible, permeable member is mounted in juxtaposition to the inlet side of the bleed opening for movement with the diaphragm; whereby the pilot flow is through the permeable member and then through the bleed opening.

DESCRIPTION OF THE PREFERRED EMBODIMENT

Figure 1:
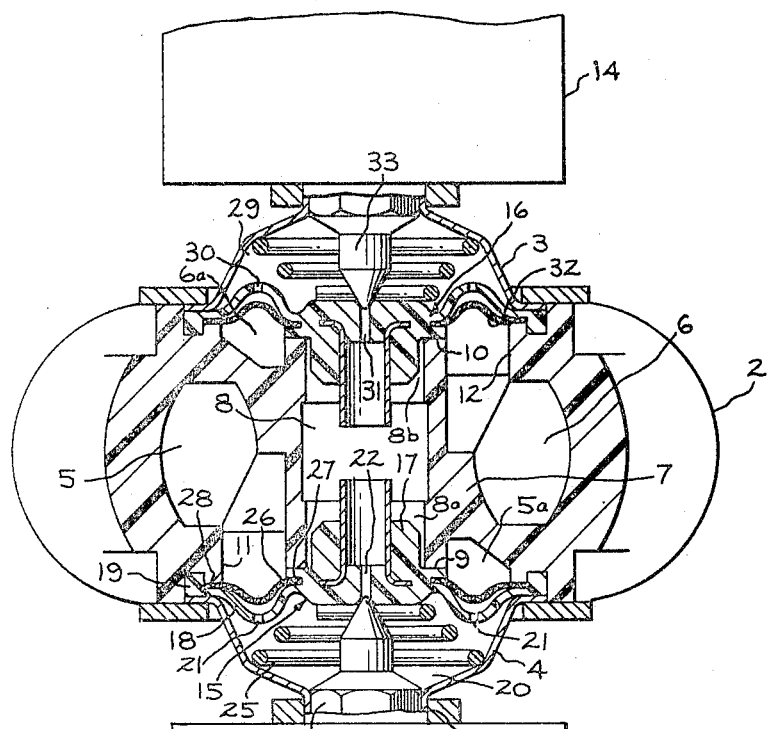
FIGURE 1 is a partial plan view of a flow control and mixing valve incorporating one embodiment of the invention, the view being partly broken away and partly in section for purposes of illustration.
Figure 2:
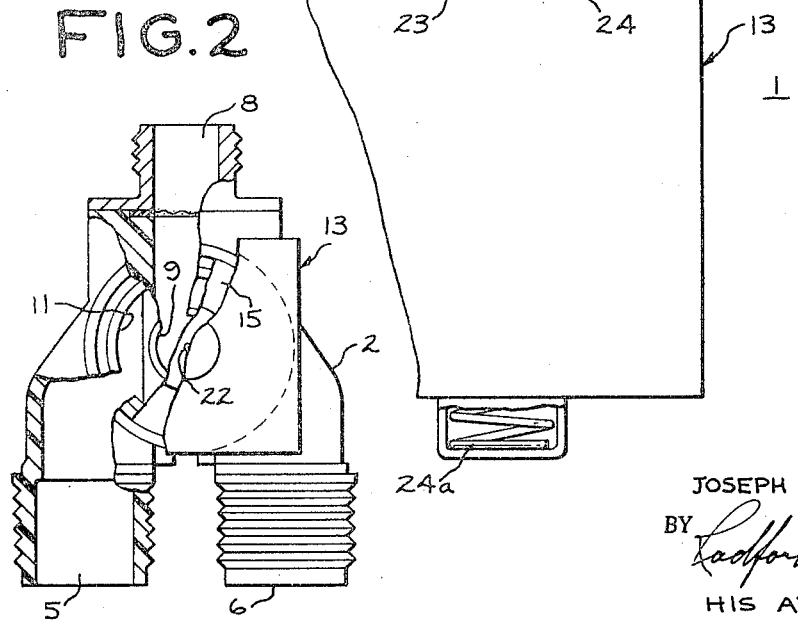
FIGURE 2 is a front elevational view of the valve of FIGURE 1, also partly broken away to show details.

Referring now to the drawing there is shown therein a combination flow control (or shut-off) and mixing valve 1 incorporating a preferred embodiment of this invention. The combination valve 1 is adapted to pass water or other liquid from either or both of two inlets to a common outlet. The valve includes a housing formed by a body member 2 and a pair of end caps or end walls 3 and 4. The body 2 may be formed as a unitary member, such as by casting, to provide two separate inlets 5 and 6 separated by a continuous intermediate wall 7, which also forms a combined mixing chamber and outlet 8. In the embodiment shown, the intermediate wall is provided with a ring-like shoulder 9 at one end and a similar shoulder 10 at the other end.

This construction provides two essentially identical inlet and outlet arrangements. That is, a generally circular peripheral wall 11 and shoulder 9 provide an annular extension 5a of the inlets, which extension surrounds a centrally disposed outlet passage 8a leading to chamber 8. As shown inlet 5a is disposed radially outward of the outlet passage 8a and the two are separated by the continuous wall formed by shoulder 9. A similar peripheral wall 12 cooperates with shoulder 10 to provide an identical relationship between inlet extension 6a and a passage 8b leading to the combined mixing chamber and outlet 8. Thus, the main stream of liquid flowing in through inlet 5 must flow over the continuous wall formed by shoulder 9 in order to reach the outlet 8 and the main stream of liquid flowing in through inlet 6 must flow over the continuous wall formed by shoulder 10 in order to reach outlet 8.

The flow from the inlet 5 to the outlet 8 is controlled by a solenoid 13 and the flow from the inlet 6 to the outlet 8 is controlled by a solenoid 14. The two solenoids 13 and 14 specifically control the flow by controlling respectively the operation of valve diaphragms 15 and 16, which are mounted within the valve housing. These diaphragms are both of the pilot actuated type and are identical, both in construction and operation, so that, for simplicity and ease of description, only the operation of the diaphragm 15 will be described in detail.

The diaphragm 15 includes a firm, central or valve portion 17, which engages the ring-like shoulder 9, and a flexible portion 18, which extends outward from the central portion 17. The flexible portion terminates in a shoulder 19 which is firmly held between the body member 2 and end cap 4. In this manner the diaphragm 15 cooperates with the end cap 4 to form an essentially closed chamber 20. With the diaphragm in its normal position (as shown in the drawing) it prevents the inlet 5 from communicating with the outlet 8.

The diaphragm has a bleed opening in the form of one or more small bleed holes 21 through its outer flexible portion, so that high pressure liquid in the inlet 5 will leak through the diaphragm into the chamber 20. As a result, providing that no liquid can escape through a control port 22 in the central portion of the diaphragm, which is normally closed by a plunger 23, the pressure per square inch exerted on the outside of the diaphragm (exposed to the chamber 20) will be equal to the pressure exerted on the inside of the diaphragm (exposed to the inlet 5). Since, as is readily apparent from the diagram, there is a much larger diaphragm surface exposed to the chamber 20 than to the inlet 5 there will be an effective force differential which will cause the central valve portion of the diaphragm to be held tightly against the shoulder 9 so as to seal off the combination mixing chamber and outlet 8 from the inlet 5.

When, however, it is desired to have liquid flow from the inlet 5 to the outlet 8 the solenoid 13 is energized. The solenoid controls the plunger 23 which, as shown is arranged for longitudinal movement within an outward tubular extension 24 of the end cap 4. The inner tapered end of the plunger 23 normally seats in the control port 22 so that no leakage can occur therethrough. However, as soon as the solenoid 13 is actuated, it pulls the plunger away from the diaphragm and opens the control port 22. As a result the liquid in the chamber 20 immediately begins to leak through the control port 22, and the liquid within the chamber 20 escapes at a fast rate into the outlet 8. The pressure on the outer surface of the diaphragm thereby becomes insufficient to hold the diaphragm seated on the ring-like shoulder or wall 9 against the pressure on the inner side of the diaphragm. The diaphragm is forced off the wall to open a direct passageway from the inlet 5 to the combination mixing chamber and outlet 8, and the liquid flows freely from the inlet to the outlet. To this end, the area of control port 22 should be larger than the total area of bleed opening 21 (whether one or more bleed holes are used). Thus, liquid can drain through port 22 faster than it enters openings 21.

This flow continues so long as the solenoid 14 remains energized. When it is desired to shut off the flow the solenoid 13 is de-energized and the plunger 23 is returned to contact with the diaphragm by biasing spring 24a disposed behind the plunger. As soon as the plunger 23 closes the control port 22, the pressure again begins to build up in the chamber 20. In a short time the total force applied to the outside of the diaphragm becomes greater than the force applied to the inside of the diaphragm. This forces the central valve portion of the diaphragm to seat firmly against the shoulder 9. This, of course, closes off the flow to the combination mixing chamber and outlet 8. It will be noted that a spring 25 is disposed between the end cap 4 and the central valve portion 17 of the diaphragm to aid in this closing action.

It will be seen that the opening and closing of the valve is effected by controlling the pilot flow. If the bleed holes (or opening) 21 were to become clogged, as by some solid contaminant in the liquid becoming hung therein, insufficient fluid would flow into the chamber 20 and the pressure could not build up and cause the valve portion 17 to firmly seat against shoulder 9. Similarly, if a solid contaminant did work its way through the bleed opening and then became lodged in the control port 22, it could reduce the flow through the control port and thus cause the opening action of the valve to be erratic. This would result because the fluid flow out of chamber 20 would be too slow. Also, if a solid contaminant happened to be caught between the central valve portion 17 and the plunger 23 at the inner end of control port 22, the valve might not close firmly, since fluid would continually leak around the plunger to the control port and prevent the proper pressure build up in the chamber 20.

Therefore, as an important aspect of this invention, there is provided an arrangement for filtering the pilot liquid. In the embodiment illustrated the filter takes the form of a continuous permeable member 26, which may be formed as an annulus. The inner edge of this member is connected to the central valve portion 17 of the diaphragm (as shown at 27) by any suitable method such as, for instance, molding the member integrally with the diaphragm. The outer edge of the porous member need not necessarily be physically attached to the diaphragm. In the embodiment shown, the outer edge 28 is captured and firmly held between the end cap 4 and the body member 2. Thus, the permeable member is mounted for movement with the diaphragm and is disposed in juxtaposition to the bleed holes 21. In fact, with the preferred embodiment shown all of the liquid adjacent the flexible portion 18 of the diaphragm has been filtered by the permeable member. The permeable member is made flexible so that it will move with the diaphragm without undue stress on the member. With this construction the pilot liquid flows through the permeable member 26, then through the bleed holes 21 to the chamber 20 and then, when plunger 23 is retracted, it flows out through control port 22. Thus the pilot liquid is filtered so as to remove any solid contaminant. This prevents any such contaminant from being caught in either the bleed holes 21 or the control port 22.

The permeable member 26 may be of any suitable construction so long as the individual holes or openings through it are each somewhat smaller in area than each of the bleed holes 21 and the total area of the openings or holes in the permeable member is larger than the total area of the bleed holes. Such a construction will ensure that any material passing through the permeable member is of a size to freely pass through the bleed holes and the control port. At the same time, it will ensure that, should a portion of the permeable member become stopped up by catching or fitering out of the pilot liquid some contaminant, enough liquid will still flow through the permeable member to properly feed the chamber 20. By way of example the permeable member could be a sheet of rubber or plastic material with a large number of small holes formed therein by some suitable means such as punching, or it could be a fairly fine mesh screen of some suitable material such as either a metal or a synthetic material like nylon.

It will also be noted that the positioning of the permeable member is such that the main liquid flow, when the valve is open, is essentially tangential to the filtering surface of the member. Thus, the main liquid flow will tend to clean the porous member and free it of any contaminants it has removed from the pilot flow.

As mentioned above, the construction and action of diaphragm 16 is identical to that of the diaphragm 15 so that no detailed description of it will be given herein. However, it will be noted that diaphragm 16 cooperates with end cap 3 to form an essentially closed chamber 29, that bleed holes 30 lead from the inlet 6 to the chamber 29 and that a control port 31 leads from chamber 29 to combination mixing chamber and outlet 8. Additionally, a flexible, permeable member 32 is mounted for movement with the diaphragm 16 in juxtaposition to the bleed hole 30. Also, it will be seen that the central portion of the diaphragm normally seats on the shoulder 10 of wall 7 to thereby close off the passage of liquid from inlet 6 to outlet 8. The diaphragm remains in the closed or seated position so long as a spring biased plunger 33, controlled by the solenoid 14, remains in the illustrated position, closing the control port 31 through the center of the diaphragm. However, when the solenoid 14 is energized so as to pick up the plunger 33, the diaphragm 16 is at that time moved upwardly by the inlet pressure so as to allow free communication between the inlet 6 and the combination mixing chamber and outlet 8. The permeable member 32 functions to filter the pilot flow in the same manner that the porous member 26 filters the pilot flow to chamber 20.

This invention has been illustrated as embodied in a valve of the type which is used as a combination water shut-off and mixing valve for domestic laundry machines as this is one area in which the invention may be used to good advantage. It is quite desirable for these machines to have low cost, reliable water inlet control valves and domestic water supplies quite often contain fairly large quantities of solid contaminants such as rust and scale. The particular valve shown is for purposes of illustration only and the invention may be incorporated in other valves without departing from the true spirit and scope of the invention.

What is claimed as new and desired to be secured by Letters Patent of the United States is:

1. A valve comprising:
   (a) a housing having inlet means and outlet means,
   (b) a flexible diaphragm mounted in said housing and movable between valve closed and valve open positions,
   (c) bleed opening means in said diaphragm to allow pilot flow through said diaphragm,
   (d) a flexible permeable member having an inner edge secured to said diaphragm for movement therewith and having a stationary outer edge secured to said housing,
   (e) said permeable member being mounted in juxtaposition to the inlet side of said bleed opening means whereby the pilot flow is through said permeable member and then through said bleed opening.

2. A valve as set forth in claim 1 wherein said bleed opening means comprises a plurality of openings and said permeable member is annular and in juxtaposition to all of said openings.

3. A valve comprising:
   (a) a housing with a peripheral wall and an end wall, a continuous wall within said housing defining a central outlet and, in cooperation with said peripheral wall, defining an inlet radially outward from said outlet;
   (b) a flexible diaphragm mounted in said housing, said diaphragm cooperating with said end wall to form a substantially closed chamber removed from said inlet and said outlet;
   (c) said diaphragm defining a bleed opening connecting said inlet and said chamber for said pilot flow therebetween, said diaphragm further defining a control port connecting said chamber and said outlet for pilot flow therebetween;
   (d) means for selectively closing said control port, resulting in said diaphragm moving into engagement with said continuous wall to prevent flow through said valve, and opening said control port, resulting in said diaphragm moving out of engagement with said continuous wall and to permit flow through said valve; and
   (e) a flexible permeable member mounted in juxtaposition to the inlet side of said bleed opening for movement with said diaphragm, whereby said pilot flow is through said permeable member and then through said bleed member;
   (f) said diaphragm including a firm central portion for selectively engaging said continuous wall, said control port being formed in said central portion, and a flexible portion extending outwardly therefrom and being secured between said peripheral wall and said end wall;
   (g) said permeable member being formed as a continuous element, the radially inner edge of said element being secured to said central portion of said diaphragm and the radially outer edge of said element being secured between said peripheral wall and said end wall.

4. A valve as set forth in claim 3 wherein said permeable member defines a plurality of holes, each hole being smaller in area than said bleed opening and the total area of said holes being larger than said bleed opening.

References Cited

UNITED STATES PATENTS

| | | | |
|---|---|---|---|
| 2,301,581 | 11/1942 | Ray | 251—45 X |
| 2,844,352 | 7/1958 | Dahl | 251—45 X |
| 2,861,590 | 11/1958 | Loehle | 137—513.7 |
| 2,916,251 | 12/1959 | Butts | 251—40 |

ARNOLD ROSENTHAL, *Primary Examiner.*

U.S. Cl. X.R.

137—550; 251—45